United States Patent [19]

Law et al.

[11] Patent Number: 4,802,896
[45] Date of Patent: Feb. 7, 1989

[54] MODIFIED RESINS AND ABRASIVE ARTICLES MADE WITH THE SAME AS A BOND SYSTEM

[75] Inventors: Kam W. Law, Oakdale; Walter W. Goethel, St. Paul, both of Minn.

[73] Assignee: Minnesota Mining and Manufacturing Company, St. Paul, Minn.

[21] Appl. No.: 129,826

[22] Filed: Dec. 8, 1987

[51] Int. Cl.$^4$ ............................................. C09K 3/14
[52] U.S. Cl. ...................................... 51/298; 51/295
[58] Field of Search ............................... 51/295, 298

[56] References Cited

U.S. PATENT DOCUMENTS

| | | | |
|---|---|---|---|
| 3,087,803 | 4/1963 | Bakian | 51/298 |
| 3,864,101 | 2/1975 | Charvat | 51/298 |
| 4,078,340 | 3/1978 | Klecker et al. | 51/298 |
| 4,239,503 | 12/1980 | Harris et al. | 51/298 |
| 4,404,003 | 9/1983 | Harris | 51/298 |
| 4,472,173 | 9/1984 | Brüning et al. | 51/298 |
| 4,609,381 | 9/1986 | Narayanan et al. | 51/298 |
| 4,657,563 | 4/1987 | Licht et al. | 51/309 |
| 4,682,988 | 7/1987 | Narayanan et al. | 51/298 |

OTHER PUBLICATIONS

Itoh et al., "Functional Metallo–Macrocycle Derivatives and their Polymers 19. Synthesis of Water Soluble Metallophthalcyanine Derivatives and Formaldehyde Condensation with Methylolurea", Journal of Polymer Science: Part C: Polymer Letters, vol. 25, 413–416, (1987).

NASA Publication, vol. 10, No. 2, Item 108, Mar./Apr. 1986.

"Metal (II) 4,4′,4″,4‴-Phthalocyanine Tetramines as Curing Agents for Heat Reactive Epoxy Formulation", Journal of Polymer Science; Polymer Chemistry Edition, vol. 21, 1505–1516, Achar et al., (1983).

Achar et al., "Mass Spectroscopy of Epoxylated Novolac Resin Cured with Phthalocyanine Tetraamines," Journal of Polymer Science; Polymer Chemistry Edition, vol. 22, 1471–1479, (1984).

*Primary Examiner*—Prince E. Willis
*Assistant Examiner*—Willie J. Thompson
*Attorney, Agent, or Firm*—Donald M. Sell; Richard Francis

[57] ABSTRACT

The invention provides a novel resin comprising the reaction product of reactive, curable phenolic resin such as resole phenolic resin with a thermally stable, aromatic ligand such as a phthalocyanine compound and abrasive products which include a bond system comprising a mixture or reaction product of a curable hard resin and thermally stable, aromatic ligand. The preferred abrasive products are coated and three-dimensional, low density abrasive products.

11 Claims, No Drawings

MODIFIED RESINS AND ABRASIVE ARTICLES MADE WITH THE SAME AS A BOND SYSTEM

FIELD OF THE INVENTION

The present invention relates to modified resins and to abrasive articles made by using such resin as a bond system.

BACKGROUND

In general, abrasive articles such as bonded abrasives (e.g., grinding wheels and grinding stones), coated abrasives and three-dimensional low density nonwoven abrasives include a bond system which bonds the particles of abrasive grain to and/or within the abrasive article. The bond system for abrasive articles typically comprises glutinous or resinous adhesive material which may include additives such as inorganic fillers, grinding aids, surfactants, wetting agents, dyes and/or plasticizers. Examples of glutinous or resinous adhesive include hide glue, phenolic resins, urea-formaldehyde resins, melamine-formaldehyde resins, epoxy resins, acrylate resins, urethane resins, varnishes and combinations of two or more of these.

Bond systems for abrasive articles commonly include phenolic resin as the adhesive material. Phenolic resin provides the heat resistance, hardness, and strength required for abrasive-type applications. Abrasive articles containing coarse grade abrasive grain, which are generally used for high pressure, high stock removal applications, usually place the most severe burden on a bond system. The bond system must be able to hold the abrasive article together under these conditions which can include thermal shocks and extreme pressures at the grinding interface.

The resin is a critical component of the abrasive article. If the resin cannot withstand these severe and rigorous abrading conditions, it will no longer hold the abrasive article together and the article will fail. Failure under such conditions may create a serious safety hazard and can cause parts of the article and/or abrasive grain to be propelled from the article at high speed. The propelled material could injure the operator and/or others who may be nearby.

Furthermore, some organic resins may degrade when exposed to high temperature. This degradation reduces the bonding power and support of the bond system, resulting in loss or reduction in effectiveness at high temperatures. While there have been many suggestions of making modifications in the bond system in an attempt to overcome such problems, there still remains considerable room for improvement.

Certain references describe the addition of phthalocyanine, a highly aromatic, thermally stable compound, to resinous materials, but not for the acknowledged purpose of improving the resistance to thermal degradation of the resin to improve the abrasive performance of an abrasive article. For example, NASA publication, Volume 10, Number 2, Item 108, published March/April, 1986, describes using a phthalocyanine precursor as a lubricant additive forming a metal phthalocyanine in situ to provide a protective and lubricating coating. Russian Pat. No. 812550, published Mar. 25, 1981, discloses the mixture of copper phthalocyanine and a rubber binder for an abrasive tool, e.g., grinding wheel. Additionally, U.S. Pat. No. 4,078,340, assigned to te assignee of the present application, discloses a nonwoven abrasive product made with a phenolic binder which contains a color pigmenting amount (less than 0.5% by weight) of phthalocyanine green. Achar et al, in an article entitled "Metal (II) 4,4', 4", 4'''-Phthalocyanine Tetramines as Curing Agents for Heat Reactive Epoxy Formulations", *Journal of Polymer Science; Polymer Chemistry Edition*, Vol. 21, 1505–1516 (1983), disclose using amino-substituted phthalocyanine as a curative for epoxy resin. Achar et al, in an article entitled "Mass Spectroscopy of Epoxylated Novolac Resin Cured with Phthalocyanine Tetraamines", *Journal of Polymer Science: Polymer Chemistry Edition*, Vol. 22, 1471–1479 (1984), disclose curing epoxylated novolac resin with metal (II) phthaloycanine tetraamines. Also, a recently published article by Itoh et al entitled "Functional Metallo-Macrocycle Derivatives and their Polymers 19. Synthesis of Water Soluble Metallophthalcyanine Derivatives and Formaldehyde Condensation with Methylolurea" *Journal of Polymer Science: Part C: Polymer Letters*, Vol. 25, 413–416 (1987) discloses the formaldehyde condensation of amido-substituted metallophthalocyanine with phenol or resole to produce novolac or resole phenol resin.

While the prior art discussed above discloses mixing phthalocyanine compounds with synthetic resins and reacting phthalocyanines with resins such as epoxy, it does not disclose prior to the present invention the reaction of phthalocyanine compounds with phenolic resin. Also, there is no disclosure prior to the present invention of more than a pigmenting amount of a phthalocyanine compound being mixed or reacted with a hard curable resin to provide a bond system for coated or three-dimensional, low density abrasive articles.

SUMMARY OF THE INVENTION

The present invention provides in one aspect a novel resin system comprising the reaction product of a thermally stable, aromatic ligand such as a phthalocyanine compound with reactive, curable phenolic resinous materials, most preferably a resole phenolic resin. In another aspect, the invention provides abrasive articles which include a resin bond system which comprises the ligand compound such as a phthalocyanine compound and curable hard resin. The ligand may be mixed or reacted with the hard resin in the resin bond system. The presently preferred hard resin compound of the bond system is also a resole phenolic resin.

The thermally stable, aromatic ligand comprises a large aromatic moiety around a central metallic ion in a complex compound. In cases where the ligand reacts with the resin, the ligand includes one or more reactive sites, either within the aromatic structure such as a reactive functional group, or associated with the metal ion, which will bond with the reactive, curable resin.

The abrasive articles exhibit increased abrading performance over similar abrasive articles which have a resin bond system containing the same resin bond system without the ligand. The preferred abrasive articles are coated abrasive articles and three-dimensional, low density abrasive articles.

As used herein, "reactive, curable hard resin" means a curable precursor or prepolymer of a resinous material which when cured provides a hard, nonelastomeric product. The precursor or prepolymer has one or more reactive sites which are capable of chemical reaction with the ligand to provide, on curing, a hard resin matrix which includes the ligand chemically bonded therein. Typical examples of such resins include phenolic resins, urea-formaldehyde resins, melamine-formaldehyde resins, epoxy resins, polyurethane resins, and the like.

DETAILED DESCRIPTION

The ligands are sufficiently thermally stable to resist thermal degradation when heated at a temperature up to about 100° C. for at least 60 minutes of exposure to ambient atmospheric conditions. The preferred ligands are phthalocyanine compounds. Phthalocyanine compounds are well known materials which are readily commercially available. Phthaloycanine compounds as a structural unit comprise four isoindole groups $(C_6H_4)C_2N$ linked by four nitrogen atoms so as to form a conjugated chain.

Most phthalocyanines are very thermally stable at least to 100° C. Most phthalocyanine compounds, when exposed to heat, do not melt. These compounds vaporize and sublime when exposed to extreme conditions such as temperatures greater than 500° C. and greatly reduced pressures. Many phthalocyanine compounds exhibit stability to heat and atmospheric oxidation at 200° C. or higher. Also, phthalocyanines will oxidize to phthalimides in the presence of moisture and a strong oxidizing agent. The good thermal properties of phthalocyanine compounds are attributed to their high aromatic character, which exceeds benzene by a factor of 15. The thermal and chemical properties are also dependent on the central ion (M in the formula below) in the phthalocyanine compound.

Metal-free phthalocyanine compounds are disclosed in U.S. Pat. No. 3,357,989. Phthalocyanine compounds which have reactive functional groups are commercially available. For example, copper phthalocyanine -3,4', 4", 4'''-tetrasulfonic acid, tetrasodium salt is available from the Aldrich Chemical Company under the catalog No. 24,535-6. Additionally, nickel phthalocyaninetetrasulfonic acid, tetrasodium salt is also available from Aldrich Chemical Company as its catalog No. 27,490-9.

Phthalocyanine compounds contain an 18 $\pi$ electron ring and typically has a structure which may be represented as follows:

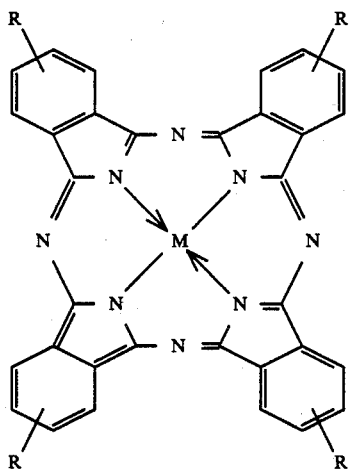

wherein R is a reactive group, for example selected from sulfonyl halide, acid halide, isocyanato-, thioisocyanato-, chlorosilyl ether,

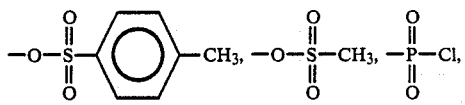

$-NO_2$, $-I$, $-Br$, amino, amido, $-CHO$, $-CO_2H$, and the like and M is a divalent metal cation. The preferred reactive R substituent is a sulfonyl halide, acid halide, isocyanato-, thioisocyanato-, chlorosilyl ether, amino and amido. M is a cation of a metal such as copper, nickel, cobalt, or iron, and most preferably copper.

According to the invention, the above-described phthalocyanine compounds are reacted with reactive, curable phenolic resins to provide novel compositions. The phthalocyanine compounds are also mixed with or reacted with curable hard resins to provide a hard resin bond system for novel abrasive articles such as coated abrasive products and three-dimensional, low density abrasive products. It has been found, quite unexpectedly, that the addition of the phthalocyanine compound to conventional hard resin bond systems significantly improves the abrading characteristics of coated abrasive articles.

Resole phenolic resin is one type of reactive curable phenolic resin with which the phthalocyanine compound may be reacted to provide a novel composition of matter and a resin bond system for coated or three-dimensional low density abrasive products. Phenolic resins are usually either resole or novolac type. Resole phenolics are characterized by being alkaline catalyzed and having a molar ratio of formaldehyde to phenol of greater than or equal to one, typically from about 1 to about 3. Examples of the alkaline catalysts used to prepare resole phenolics include sodium hydroxide, barium hydroxide, calcium hydroxide, organic amines, or sodium carbonate. The curing environment of the curable resole phenolic resin is alkaline, preferably having a pH on the order of 8.5–9. Resole phenolic are thermosetting resins and in the cured form are hard and exhibit excellent toughness, strength, and heat resistance, all properties which make resole phenolic ideally suited as a bonding adhesive for abrasive grains.

Novolac phenolics are characterized by being acidic catalyzed and having a molar ratio of formaldehyde to phenol of less than one, typically from about 0.5 to about 0.8. Examples of the acid catalysts used to prepare novolac phenolics include sulfuric, hydrochloric, phosphoric, oxalic and p-toluenesulfonic acids. Novolac phenolics are thermoplastic resins which in the cured form are brittle solids. Novolac phenolics react with other chemicals to form a crosslinked solid.

The resole and novolac phenolic resins are cured by heat. The temperature and pH significantly affect the mechanism of polymerization and the final properties of the cured resin. Phenolic resins are used in a wide range of applications such as for molding materials, friction materials, coatings, adhesives, and laminating adhesives.

Examples of useful commercially available phenolics are available under the tradenames Varcum from BTL Specialty Resins Corp., Aerofene from Ashland Chemical Co., Bakelite from Union Carbide and Resinox from Monsanto Other curable resins with which the phthalocyanine compound may be mixed and/or reacted to provide a bond system for abrasive products include urea-formaldehyde resin, melamine-formaldehyde resin, epoxy resin, urethane resin, polyisocyanate resin, polyester resin, or combinations of one more more of these.

Urea-formaldehyde is a well-known commercially available resin used extensively in a wide range of applications. Urea and urea-formaldehyde prepolymer are water soluble and well known commercially available materials. Melamine-formaldehyde resins, which are derived from urea, when polymerized produce a very hard material which is only slightly sensitive to water. Useful commercial urea-formaldehyde resins are available under the tradenames Uformite from Reichhold Chemical, Inc., Durite from Borden Chemical Co. and Resimene from Monsanto. Examples of useful commercial melamine-formaldehyde resins are available under the tradenames Uformite from Reichhold Chemical, Inc., and Resimene from Monsanto.

The R group of the phthalocyanine compound can react with reactive, curable hard resin to form a chemical bond with the reactive, curable hard resin. For example, if the R group is $-SO_2Cl$, the phthalocyanine ligand may be represented by the following formula: $(C_8H_3N_2)_4(SO_2Cl)_4$. If the curable resin is the sodium salt of a resole phenolic resin $(Na^+OR^1)$ wherein $R^1$ represents the organic portion of the resin less the hydroxy groups, the reaction of the ligand may be illustrated as follows:

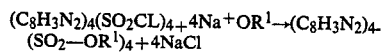

The weight ratio of ligand (e.g., phthalocyanine compound) to reactive, curable resin to produce the novel compositions of matter is in the range of about 1:10 to 4:1, preferably 1:10 to 2:1. The amount of ligand added to or reacted with the resin to provide a bond system for novel abrasive articles will be that sufficient to provide improved abrading characteristics over the abrading characteristics of the same abrasive article having a bond system of the same resin without the ligand. That amount is typically at least 3% by weight ligand, preferably about 15 to 80% by weight, based upon the combined weight of the ligand and resin.

The preferred bond system is provided by reacting the ligand with phenol in an amount of ligand of about 10-100 (most preferably 10-50) parts by weight per 100 parts by weight of phenol.

After mixing or reaction, the new bond system may be employed in a conventional manner to make abrasive articles such as grinding wheels, grinding stones, coated abrasives, or three-dimensional low density abrasive products. The bond system may include such conventional additives known in the art such as inorganic fillers, active fillers known as grinding aids, wetting agents, dyes, surfactants, plasticizers, or combinations of two or more of these.

The coated abrasive products according to the invention are characterized by having at least a make coating or a size coating of the modified resin of the invention as a bond system The conventional components forming the coated abrasive product of the invention will be selected from those typically used in this art. The backing may be formed of paper, cloth, vulcanized fibre, film or any other backing material known for this use. The abrasive granules may be of any conventional grade utilized in the formation of coated abrasives and may be selected from flint, garnet, aluminum oxide, alumina:zirconia, diamond, and silicon carbide, etc., or mixtures thereof.

The frequency of the abrasive granules on the sheet will also be conventional. The abrasive granule may be oriented or may be applied to the backing without orientation, depending upon the requirments of the particular coated abrasive product. Either the make coat or the size coat of the coated abrasive product may be formed of a resinous material known for this use. The remaining coat is formed of the modified resin according to the invention. Both the make and the size coat may be formed of the modified resin. It is also within the scope of the present invention to use the modified resin as a treatment for the fabric backing materials of the coated abrasive product.

The coated abrasive product of the invention may also include such modifications as are known in this art. For example, a back coating such as pressure-sensitive adhesive may be applied to the nonabrasive side of the backing and various supersizes may be applied to the abrasive surface, such as zinc stearate to prevent abrasive loading.

The three-dimensional, low density abrasive products are characterized by their extreme openness and low density, typically having a void volume within the range of from about 85% to 97%. The web component or structure used to prepare the pad is preferably made of nylon or polyester synthetic fibers which have been crimped and are most preferably of mixed denier. That is, the web contains both small and large diameter fibers to provide the open, low-density structural properties to the pad and relatively fine fibers to provide softness, some water-retaining ability and a greater surface for abrasive to be adhered. The large diameter fibers are on the order of 40 to 70 denier (about 60–100 micrometers in diameter) and at least about one inch (2.5 cm) long when fully extended. The smaller diameter fibers are of the same minimum length and in the range of about 10 to 20 denier (about 30–50 micrometers in diameter).

Crimping can be accomplished by well known "gear" or "stuffer box" crimping methods or by other known methods. The filaments should have from 5 to 8 crimps per centimeter to provide sufficient entanglement of fibers for a handleable web. Crimping will typically cause a 50% reduction in fiber length. For example, a crimped 4 cm fiber will have an extended length of 4 cm and an apparent unextended length of about 2 cm.

The weight ratio of the small diameter fibers to the large diameter fibers is relatively important to maintain the desired degree of openness, structure and a moderate degree of water retention. Preferably, the weight ratio of large diameter fibers to small diameter fibers is in the range of about 1:3 to about 3:1; most preferably this ratio is about 1:1.

The web component is prepared having a thickness on the order of at least two times the desired resultant thickness and a width limited by web producing equipment. Typically, the web component will weigh on the order of 400 grams per square meter.

The abrasive materials for three-dimensional, low density abrasive products of the invention typically includes such material as garnet, flint, silica, pumice, calcium carbonate, silicon carbide, and aluminum oxide. The particle size of the abrasive preferably is on the order of about 180 grade (average diameter about 90-100 micrometers) or finer.

The amount of binder employed is adjusted toward the minimum consistent with bonding the filaments together at their points of contact and with the firm bonding of the abrasive grains. Too much binder obscures the abrasive, while too little binder forms a weak punky adhesive. It should be noted that finer grade abrasives which have greater surface area tend to affect the binders more readily than coarser grade abrasives. Binders and any solvent therefor should also be selected with the particular fiber to be used so that embrittling penetration thereof does not occur.

It should be noted that the web component, which contains mixed denier filaments or fibers, can be prepared from fibers of different compositions, for example, from both nylon and polyester. It is preferred however to prepare the web entirely formed from fibers of the same composition.

In a typical preparation, the web is roll coated with a binder dispersion to completely coat its entire bulk, bonding the fibers together. Thereafter, this coating may be first dried or a final coating of binder and abrasive may be applied immediately and both coatings cured simultaneously. The final coating containing abrasive and binder is sprayed on both major surfaces of the coated web to provide web penetration. The spray coating, upon being cured at a suitable temperature, is characterized by the formation of small globules of abrasive and binder which accumulate at contact points of the filaments on the surface which had been sprayed.

It is within the scope of the invention to include other ingredients in the abrasive pad such as pigment, fillers, and other additives.

The following examples further illustrate the invention. All parts are by weight unless otherwise specified.

EXAMPLES

Control

A control example of coated abrasive product was made according to conventional techniques. The coated abrasive backing was a Y weight woven polyester cloth with a four over one weave. The backing was first saturated with a latex/phenolic resin and then placed in an oven to partially cure the resin. Next, a latex/phenolic resin and calcium carbonate coating composition was applied to the backside of the backing and heated to partially cure the resin. Finally, the latex/phenolic resin was applied to the coat side or front side of the cloth and heated to partially cure the resin. The backing was completely treated and was ready to receive the make coat.

A make system consisted of 48% by weight a resole phenolic resin and 52% by weight a calcium carbonate filler. This was reduced to 84% solids by addition of a solvent consisting of by weight 90 parts water and 10 parts ethyl "Cellosolve", ethyl "Cellosolve" being the tradename for $C_2H_5O(CH_2)_2OH$, in order to obtain a desired coating viscosity. The make bond system was applied to the backing to provide an average wet add-on weight of 258 grams/square meter. Immediately thereafter, grade 50 (average particle size is about 470 micrometers) fused alumina:zirconia abrasive mineral was applied electrostatically to provide an average add-on weight of 752 grams/square meter. The grain-coated make coating was then precured for 90 minutes in an oven at 88° C. A size coat of the same composition as the make coat except with 78% solids was then applied to provide an average wet add-on weight of 330 grams/square meter. The resultant article was then precured for 90 minutes at 88° C. and then final cured for 10 hours at 100° C.

EXAMPLE 1

Example 1 was prepared and tested in the same manner as the Control Example except the resole phenolic resin was first reacted with a copper phthalocyanine compound. The procedure for the reaction is described below.

Copper (II) 3, 4', 4", 4'''-phthalocyaninetetrasulfonyl chloride was prepared using a procedure similar to that described by A. Skorobogaty, T. D. Smith, G. Dougherty, and J. R. Pilbrow, *J. Chem. Soc. Dalton Trans.*, 65 (1985). One hundred grams of copper phthalocyanine-3, 4', 4", 4'''-tetrasulfonic acid, tetrasodium salt was mixed with 490 grams of chlorosulfonic acid, resulting in a blue reaction mixture which was stirred one hour at room temperature and then the reaction temperature was raised to 140° C. The reaction was then cooled to room temperature and 80 grams of thionyl chloride was added dropwise to the stirred reaction mixture over a thirty minute period, resulting in a bright green reaction mixture which was then heated and maintained with stirring at 80° C. for two hours. A yield of 95 grams of copper (II) 3, 4', 4", 4'''-phthalocyaninetetrasulfonyl chloride was isolated as a fine, blue percipitate by first pouring the cooled reaction mixture onto crushed ice. The fine, blue precipitate was then washed with ice water until the wash liquid had a neutral pH, final washed with acetone, and air dried.

A copper (II) 3, 4', 4", 4'''-phthalocyaninetetrasulfonyl chloride modified phenolic resin was prepared. A mixture of 470 grams phenol, 709.5 grams 37 weight percent aqueous formaldehyde solution and 9.4 grams sodium hydroxide pellets was made in a split, 3-liter, resin kettle fitted with a mechanical stirrer, reflux condenser and a thermometer. The mixture was heated to 75° C. and maintained at that temperature for three hours, resulting in a solution which was subsequently cooled to room temperature. After cooling, 15.2 grams of sodium hydroxide was completely dissolved in the solution and then 300 ml water was removed from the solution by vacuum distillation and heat. The copper (II) 3, 4', 4", 4'''-phthalocyaninetetrasulfonyl chloride, 94 grams (20% of the phenol weight), was added to the phenolic resin prepolymer and the mixture was stirred for twelve hours at room temperature. Water was then removed using vacuum distillation and heat until a desired viscosity was obtained. Sufficient calcium carbonate filler was added to provide 48% by weight modified resole phenolic resin solids and 52% by weight calcium carbonate. The resultant mixture was reduced to 84% solids by solvent addition for the make coat and 78% solids for the size coat. The rest of the procedure for making and testing the abrasive belts was the same as described in the Control Example.

The coated abrasive sheet materials of the Control Example and Example 1 were flexed and converted in a conventional manner to 7.6 cm by 335 cm endless abrasive belts. These belts were tested on a constant load surface grinder, abrading the 2 ½cm by 17.8 cm face of a 304 stainless steel workpiece with successive 30 second grinding passes, cooling and weighing after each pass. The same pressure, belt speed, and workpiece orientation (long dimension vertical), and movement was employed. The workpiece was moved vertically in a 17.8 cm path in a cycle from its original position and back again. The grinding conditions included a grinding pressure of 3.6 kg per cm width of workpiece and a 622 m/min belt speed. The endpoint of the test was when the cut in any one pass was less than 10 grams/30 seconds. Grinding results are shown in Table 1.

TABLE 1

| Example | Bond System | Cut Performance, Percent of Control |
|---|---|---|
| Control | resole phenolic resin | 100 |
| 1 | resole phenolic resin reacted copper phthalocyanine-tetrasulfonyl chloride | 147 |

As can be seen from the data of Table 1, a 47% increase in abrasive performance is achieved when the resole phenolic resin is modified with copper phthalocyaninetetrasulfonyl chloride.

EXAMPLE 2

Example 2 includes a bond system of nickel phthalocyanine modified resole phenolic resin. The procedure for making nickel phthalocyanine is identical to the procedure for making copper phthalocyanine described in Example 1, except the starting material was nickel phthalocyaninetetrasulfonic acid, tetrasodium salt.

To this modified resole phenolic resin was added calcium carbonate filler, as in Example 2, to provide a bond system with 48% by weight resole phenolic resin solids and 52% by weight the calcium carbonate filler, and the resultant mixture was diluted with solvent to 84% solids for the make coat and 78% solids for the size coat. A new Control Example was also prepared following the same procedures as the previously described Control Example. The remainder of the procedure for making and testing the abrasive belts was the same as described above. Testing results are shown in Table 2.

TABLE 2

| Example | Bond System | Cut Performance, Percent of Control |
|---|---|---|
| Control | resole phenolic resin | 100 |
| 2 | resole phenolic resin reacted with nickel phthalocyanine-tetrasulfonyl chloride | 107 |

A noticable performance increase is achieved when the nickel phthalocyanine reacted with a resole phenolic resin is used as the bonding system for coated abrasives.

EXAMPLES 3-4

Examples 3 and 4 are coated abrasives made according to the invention having at least one of the make or size coat of copper phthalocyanine modified phenolic resin with the other resin, if used, being unmodified phenolic resin. Again, a new control was prepared like the first-described Control Example. The abrasive performance of belts containing copper phthalocyanine modified phenolic resin in the make coat or in the size coat was determined and the results are shown in Table 3.

EXAMPLE 3

Example 3 was prepared in a similar manner to the Control Example except the size coat was an unmodified resole phenolic resin as described in the Control Example and the make coat was comprised of a copper phthalocyanine compound reacted with a resole phenolic prepolymer as described in Example 1. The calcium carbonate level in the make coat bond system was 52% by weight. In order to obtain the proper coating viscosity, the make coat was diluted with solvent to 84% solids. The remainder of the steps to produce and test the abrasive belt are those of preparing and testing the Control Example and Example 1.

EXAMPLE 4

Example 4 was prepared in a similar manner to the Control Example except the make coat was unmodified resole phenolic resin and the size coat comprised a copper phthalocyanine compound reacted with a resole phenolic resin, as described in Example 1, with 52% calcium carbonate and 48% modified phenolic resin in the size coat system. In order to obtain the proper coating viscosity, the size coat was diluted with solvent to 78% solids. The remainder of the steps to produce and test the abrasive belt is the same as described above. Performance test results are shown in Table 3.

TABLE 3

| Example | Make Coat | Size Coat | Cut Performance, Percent of Control |
|---|---|---|---|
| Control | Resole Phenolic Resin | Resole Phenolic Resin | 100 |
| 3 | Copper Phthalocyanine Modified Resole Phenolic Resin | Resole Phenolic Resin | 126 |
| 4 | Resole Phenolic Resin | Copper Phthalocyanine Modified Resole Phenolic Resin | 160 |

It can be seen from the data of Table 3 a 26% performance increase is achieved when the modified resole phenolic resin is used only in the make coat and a 60% performance increase is achieved when the modified resole phenolic is used only in the size coat.

EXAMPLES 5 and 6

Example 5 was an abrasive belt containing in the bond system copper phthalocyanine mixed with resole phenolic resin. Example 6 was an abrasive belt containing in the bond system the starting material for the modified resole phenolic resin.

Example 5 was prepared in a similar manner to the Control Example except the size coat consisted of 10.1% copper phthalocyanine mixed with 37.9% a resole phenolic resin and 52% calcium carbonate. In order to obtain the proper coating viscosity, the size coat was diluted with solvent to 78% solids.

Example 6 was prepared in a similar manner to the Control Example except the size coat consisted of 10.1% copper phthalocyaninetetrasulfonic acid, tetrasodium salt; 37.9% a resole phenolic resin; and 52% calcium carbonate. In order to obtain the proper coating viscosities, the size coat system was diluted with solvent to 78% solids. Testing results are shown in Table 4.

TABLE 4

| Example | Make Coat | Size Coat | Cut Performance, Percent of Control |
|---|---|---|---|
| Control | Resole Phenolic Resin | Resole Phenolic Resin | 100 |
| 5 | Resole Phenolic Resin | Copper Phthalocyanine | 200 |

TABLE 4-continued

| Example | Make Coat | Size Coat | Cut Performance, Percent of Control |
|---|---|---|---|
| 6 | Resole Phenolic Resin | Added to a Resole Phenolic Resin Copper Phthalocyanine-tetrasulfonic Acid, Tetrasodium Salt Added to a Resole Phenolic Resin | 143 |

A 100% increase in performance over te Control Example is achieved when the bond system consisted of copper phthalocyanine added to a resole phenolic resin. A 43% increase in performance is realized when the copper phthalocyaninetetrasulfonic acid, tetrasodium salt is added to a resole phenolic resin.

While the principles of the invention have been made clear in illustrative embodiments, there will be immediately obvious to those skilled in the art many modifications of structure, arrangement, proportions, the elements, materials, and compounds used in the practice of the invention and otherwise, which are particularly adapted for specific environments and operative requirements without departing from those principles. The appended claims are intended to cover and embrace any and all such modifications, within the limits only of the true spirit and scope of the invention.

I claim:

1. An abrasive product having abrasive grain and a resin bond system, said resin bond system comprising cured hard resin and sufficient thermally stable aromatic ligand to provide said abrasive product with improved abrasive performance over that of an abrasive product having the same resin bond system without said ligand, the amount of ligand in said resin bond system being at least 3% by weight based upon the combined weight of the ligand and resin.

2. The abrasive product of claim 1 wherein said ligand is reacted with said curable hard resin.

3. The abrasive product of claim 1 wherein said bond system comprises cured hard resin having said ligand physically blended therein.

4. The abrasive product of claim 1 wherein the weight of said ligand is about 5 to 80% of the combined weight.

5. The abrasive product of claim 1 wherein said curable hard resin is a resole phenolic resin.

6. The abrasive product of claim 1 wherein said ligand is a phthalocyanine compound.

7. A coated abrasive product according to claim 1.

8. A three-dimensional, low density abrasive product according to claim 1.

9. A resin comprising the reaction product of a thermally stable, aromatic ligand and reactive, curable phenolic resin in a weight ratio of 10 to 100 parts of ligand to 100 parts of phenol.

10. The resin of claim 9 wherein said reactive, curable phenolic resin is a resole phenolic resin.

11. The resin of claim 9 wherein said ligand is a phthalocyanine compound.

* * * * *